United States Patent [19]

Dobler et al.

[11] Patent Number: 5,237,880
[45] Date of Patent: Aug. 24, 1993

[54] DEVICE FOR MEASURING A TORQUE OF A ROTATING MACHINE PART

[75] Inventors: Klaus Dobler, Gerlingen; Hansjörg Hachtel, Weissach, both of Fed. Rep. of Germany

[73] Assignee: Robert Bosch GmbH, Stuttgart, Fed. Rep. of Germany

[21] Appl. No.: 634,223

[22] PCT Filed: Jun. 24, 1989

[86] PCT No.: PCT/DE90/00423
§ 371 Date: Dec. 28, 1990
§ 102(e) Date: Dec. 28, 1990

[87] PCT Pub. No.: WO90/02931
PCT Pub. Date: Mar. 22, 1990

[30] Foreign Application Priority Data

Sep. 9, 1988 [DE] Fed. Rep. of Germany ....... 3830735

[51] Int. Cl.⁵ .............................................. G01L 3/02
[52] U.S. Cl. ............................ 73/862.325; 73/862.321
[58] Field of Search ........... 73/862.08, 862.33, 862.34, 73/862.36, 862.321, 862.325, 862.322, 862.326; 336/30, 135

[56] References Cited

U.S. PATENT DOCUMENTS

| | | | |
|---|---|---|---|
| 4,135,390 | 1/1979 | Templin | 73/862.34 |
| 4,356,732 | 11/1982 | Hachtel et al. | 336/30 X |
| 4,448,084 | 5/1984 | Dobler et al. | 73/862.33 |
| 4,592,241 | 6/1986 | Obayashi et al. | 73/862.34 |
| 4,680,976 | 7/1987 | Lustenberger | 736/862.33 |
| 5,027,663 | 7/1991 | Frister et al. | 73/862.331 |
| 5,027,663 | 7/1991 | Frister et al. | 73/862.331 |

Primary Examiner—Michael T. Razavi
Assistant Examiner—Elizabeth L. Shopbell
Attorney, Agent, or Firm—Michael J. Striker

[57] ABSTRACT

A device for measuring an angle of rotation or a torque of a rotating machine part includes a radially extending bending rod secured to the machine part for joint rotation therewith, first and second sleeve-shaped bodies secured at an end of the bending rod remote from an axis of the rotating machine part, in spaced relationship to each other, each of the first and second sleeve-shaped bodies having a plurality of slots equidistantly spaced from one another and offset circumferentially relative to the slots of another of the first and second sleeve-shaped bodies, and a third sleeve-shaped body having a plurality of equidistantly spaced slots and arranged between the first and second sleeve-shaped bodies. At least one coil is assigned to each of the first and second sleeve-shaped bodies. The coils are concentric relative to each other, and their impedance change in accordance with a relative position of the slots of the first, second and third sleeve-shaped bodies, which relative position depends on the degree of bending of the bending rod.

5 Claims, 2 Drawing Sheets

DEVICE FOR MEASURING A TORQUE OF A ROTATING MACHINE PART

BACKGROUND OF THE INVENTION

The invention relates to a measuring device comprising a torsion element including a radially extending bending rod. Such a known measuring device comprises two bodies of electrically conductive, non-magnetic material which are arranged coaxially relative to a shaft, are connected to the shaft for joint rotation therewith, and are rotatable relative to one another. Further, a coil is provided which is coaxial to the shaft. High-frequency alternating current flows through the coil, which is arranged in the immediate vicinity of the two bodies. The latter comprises cut-out portions whose reciprocal overlapping surface changes as the angle of rotation between the bodies increases, wherein the relative rotation of the two bodies can be determined for the purpose of measuring the change in impedance in the coil occurring as a result of the eddy currents induced in the bodies. A torsion rod is arranged in the axial direction of the shaft in order to produce this relative rotation, so that the measuring device has a relatively long construction (U.S. Pat. No. 4,356,732).

SUMMARY OF THE INVENTION

The object of the invention is measuring device, that has a relatively short construction and can be used under cramped installation conditions.

The object of the invention is achieved by providing first and second sleeve-shaped bodies secured at an end of the bending rod remote from an axis of the rotating machine part, in spaced relationship to each other, with each of the first and second sleeve-shaped bodies having a plurality of slots equidistantly spaced from one another and offset circumferentially relative to the slots of another of the first and second sleeve-shaped bodies, a third sleeve-shaped body having a plurality of equidistantly spaced slots and arranged between the first and second sleeve-shaped bodies, and at least one coil assigned to each of the first and second sleeve-shaped bodies. The coils are concentric relative to each other. Impedance of the coils changes in accordance with a relative position of the slots of the first, second and third sleeve-shaped bodies which relative position is a function of rod bending. Axial changes in spacing between the measurement coils and the measurement sleeves can be compensated for as a result of the sleeve-shaped measuring element, which comprises longitudinal slots formed in the axial direction of the shaft, and the arrangement of the coils on the outside and inside at the same vertical height. It is possible to determine the driving and driven torque in an accurate member with a relatively simple and compact construction.

The present invention both as to its construction so to its method of operation, together with additional objects and advantages thereof, will be best understood from the following detailed description of preferred embodiments when read with reference to the accompanying drawings.

DESCRIPTION OF THE PREFERRED EMBODIMENT

Figure 1:
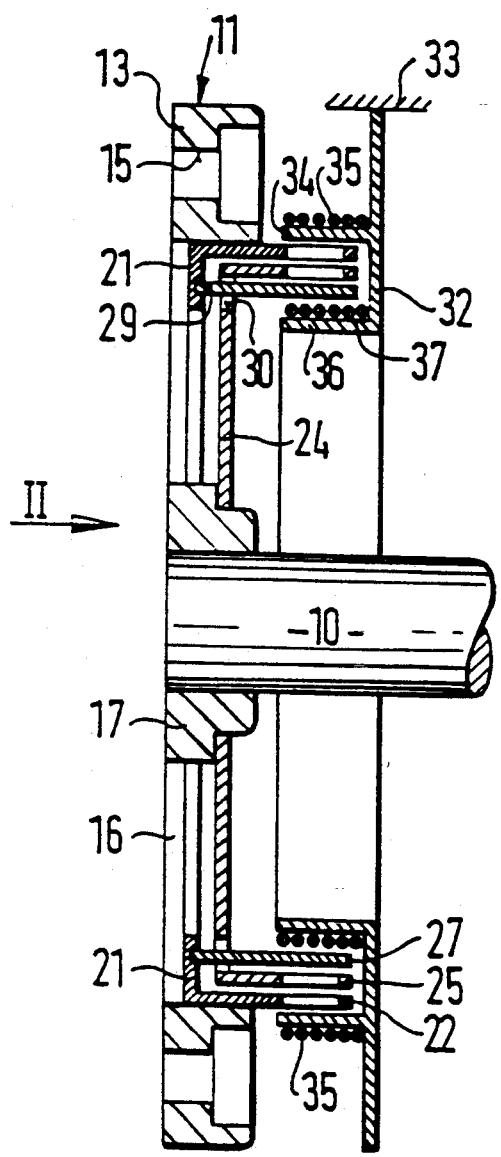
FIG. 1 shows a longitudinal cross sectional view of a torque sensor according to the invention.
Figure 3:
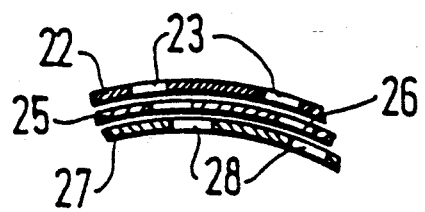
FIG. 3 shows a partial cross-sectional view of a sensor shown in FIG. 1.
Figure 2:
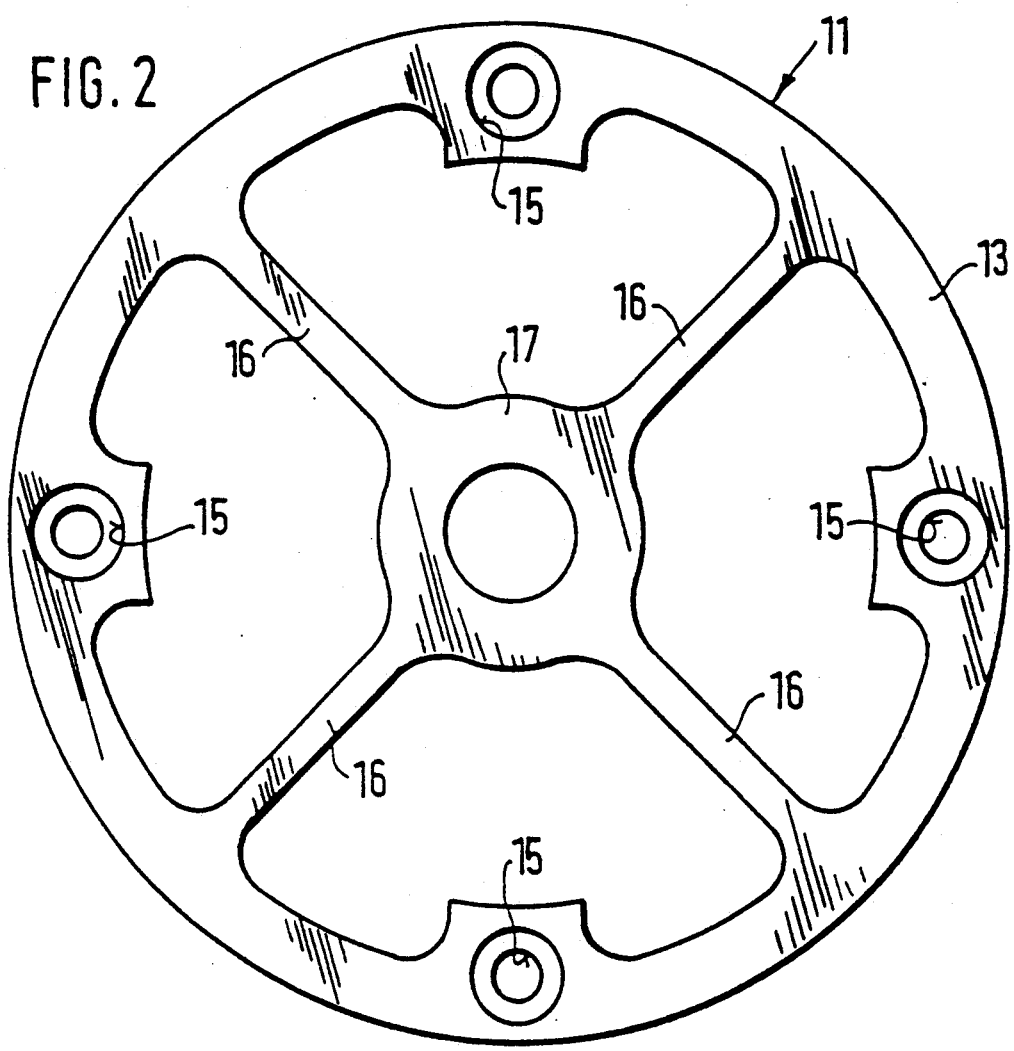
FIG. 2 shows a side view in direction of arrow II of FIG. 1.

In FIG. 1, a shaft which comprises at its end a flange constructed as a spoke wheel 11 is designated by 10. It has an outer rim 13 in which a plurality of continuous holes 15 are formed at a distance from one another of approximately 90°; e.g. an electric motor, not shown, can be flanged on via the holes 15. A driving torque can accordingly be introduced on the rim 13. The spokes 16 of the spoke wheel 11 are securely connected with the hub 17 and the rim 13 and serve as bending rods.

A sleeve 22, which comprises longitudinal slots 23 extending in the longitudinal direction of the sleeve 22, is fastened as far as possible in the area of the rim 13 at the spoke 16 or at the rim 13 itself with a bracket 21. Further, a second sleeve 25 comprising longitudinal slots 26 formed in the axial direction of the sleeve is supported at the hub 17 with a carrier 24. A third sleeve 27, which likewise comprises longitudinal slots 28 in the axial direction of the sleeve 27 is located inside the sleeve 25. At the side facing the spokes 16, the sleeve 27 comprises projections 29 by which the sleeve 27 projects through openings 30 formed in the carrier 24, and is fastened at the bracket 21. The longitudinal slots 23, 26, 28 of the three sleeves 22, 25, 27 are arranged in such a way that the longitudinal slots 23, 26 of the two sleeves 22, 25 and the longitudinal slots 26, 28 of the sleeves 25, 27 overlap by half in the initial position. Accordingly, during the relative movement of the sleeves 22 and 27 relative to the sleeve 25, the longitudinal slots 23 and 26 open, while the longitudinal slots 26, 28 close, and vice versa.

A coil body 32, which is F-shaped in cross section and is fastened at a housing 33, is arranged around the three sleeves. A first coil 35 is wound on the outer wall of the sleeve part 34 of the coil body 32. A second coil 37 is fastened on the second sleeve part 36 of the coil body 32. The sleeves 22, 25, 27 are moved between the two sleeve parts 34, 36.

Figure 4:
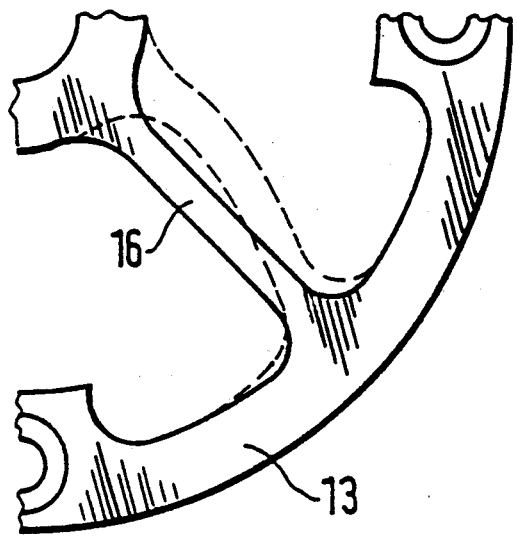
FIG. 4 shows a partial view of the sensor with the torsion element in a basic position and in a twisted state.

If a torque M1, e.g. a driving torque, is introduced into the spoke wheel 11, a torque M2, a so-called driven torque, can be tapped via the shaft 10, so that the spokes 16 serving as bending rods are bent slightly. FIG. 4 shows, in solid lines, the spoke wheel 11 with the spokes 16 in the basic position, i.e. with spokes 16 which are not bent. The spoke wheel 11 with bent spokes 16 is shown in dashed lines. Since the sleeves 22 and 27 are rigidly connected with the crown 13 and the sleeve 25 is rigidly connected with the hub 17, a rotation of the two sleeves 22 and 27 relative to the sleeve 25 by a determined angle $\alpha_1$ is effected.

The measuring device operates according to the principle of induction or the eddy current measurement principle. In the eddy current measurement principle, high-frequency alternating current flows through the coils 35, 37. For the purpose of measurement, the sleeve 25 is rotated relative to the sleeve 22 as well as relative to the sleeve 27 in proportion to the transmitted torque. A magnetic alternating field which causes eddy currents on the metallic surfaces of the three sleeves 22, 25, 27 occurs at the two coils 35, 37. The greater the surface of the sleeves penetrated by the magnetic alternating field, the more eddy currents are produced. Further, the magnitude of the produced eddy currents depends on the material used for the sleeves, particularly their surface, as well as on the spacing of the sleeves 22, 25, 27 relative to one another and to the coils 35, 37. The alternating current resistance of the coils is reduced by the produced eddy currents, which effects a reduction of the voltage applied to the coils or, conversely, causes an increase in applied voltage when there is an increase in the alternating current resistance of the coils. In the initial position of the measuring device, the longitudinal slots 23 and 26 are overlapped by half and the slots 26 and 28 are likewise overlapped by half. If a torque is transmitted via the measuring device, the longitudinal slots 23 of the sleeve 22 are closed by the wall of the sleeve 25 by the same amount as the longitudinal slots 28 of the sleeve 27 are opened by the sleeve 25. The magnitude of the surfaces of the sleeves assigned to the coils 35, 37, i.e. the magnitude of the area on which the eddy currents can develop, is accordingly changed, which causes an opposite change in the impedance of the coils 35, 37. The coils 35, 37 are connected in a Wheatstone half-bridge circuit, so that the measurement signal tapped at the measuring bridge is proportional to the transmitted torque. It is decisive that axial displacements between the sleeves and the coils 35, 36, and errors due to environmental influences, e.g. thermal expansions, are compensated for, since they change the signal in the same direction in both coils. The measurement signals thus obtained are fed to an evaluating circuit, so that a connected machine part can be controlled and regulated.

An application of the torque sensor in direct combination with an electric motor, e.g. in an electromotive servo-steering for a vehicle is particularly advantageous. The shaft 10 then leads to the steering gear unit. The steering shaft or a servomotor is fastened to the spoke wheel 11. In the case of servo-steering, a particularly compact construction is necessary, which is enabled by the described construction with bending rods in the form of a spoke wheel.

While the invention has been illustrated and described as embodied in a device for measuring a torque of a rotating machine part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A device for measuring angle of rotation and torque of a rotating machine part, comprising a radially extending bending rod secured to the machine part for rotation therewith and defining a torsion element; first and second sleeve-shaped bodies secured at an end of said bending rod remote from an axis of said rotating machine part, in spaced relationship to each other, each of said first and second sleeve-shaped bodies having a plurality of slots equidistantly spaced from one another and arranged so that the slots of one of said first and second sleeve-shaped bodies are offset circumferentially relative to the slots of another of said first and second sleeve-shaped bodies; a third sleeve-shaped body having a plurality of equidistantly spaced slots and arranged between said first and second sleeve-shaped bodies, relative displacements of the slots of said first and second sleeve-shaped bodies with respect to the slots of the third sleeve-shaped body being defined by a degree of bending of said bending rod; and at least two coils each assigned to a respective one of the first and second sleeve-shaped bodies; said coils being concentric relative to each other, impedance of said coils changing in accordance with a relative position of the slots of said first, second and third sleeve-shaped bodies.

2. A device as set forth in claim 1, wherein said first, second and third sleeve-shaped bodies extend radially relative to said bending rod, the slots of said first, second and third sleeve-shaped bodies extending in a longitudinal direction of said sleeve-shaped bodies.

3. A device as set forth in claim 1, wherein the coils are connected in a Wheatstone bridge circuit.

4. A device for measuring angle of rotation and torque of a rotating machine part, comprising a radially extending bending rod secured to the machine part for rotation therewith and defining a torsion element; first and second sleeve-shaped bodies secured at an end of said bending rod remote from an axis of said rotating machine part, in spaced relationship to each other, each of aid first and second sleeve-shaped bodies having a plurality of slots equidistantly spaced from one another and arranged so that the slots of one of said first and second sleeve-shaped bodies are offset circumferentially relative to the slots of another of said first and second sleeve-shaped bodies; a third sleeve-shaped body having a plurality of equidistantly spaces slots and arranged between said first and second sleeve-shaped bodies, relative displacements of the slots of said first and second sleeve-shaped bodies with respect to the slots of the third sleeve-shaped body being defined by a degree of bending of said bending rod; and at least two coils each assigned to a respective one of the first and second sleeve-shaped bodies; said coils being concentric relative to each other, impedance of said coils changing in accordance with a relative position of the slots of said first, second and third sleeve-shaped bodies, said bending rod is a spoke of a spoke wheel secured on a rim of the spoke wheel for rotation therewith.

5. A device as set forth in claim 1, wherein one of said coils is located inside said sleeve-shaped bodies in a radial direction, while another of said coils is located outside said sleeve-shaped bodies.

* * * * *